(12) United States Patent
Edvardsson et al.

(10) Patent No.: US 10,942,057 B2
(45) Date of Patent: Mar. 9, 2021

(54) RADAR LEVEL GAUGE WITH $H_{01}$-MODE WAVE TRANSDUCER

(71) Applicant: Rosemount Tank Radar AB, Mölnlycke (SE)

(72) Inventors: Olov Edvardsson, Linköping (SE); Anders Jirskog, Huskvarna (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 233 days.

(21) Appl. No.: 16/018,258

(22) Filed: Jun. 26, 2018

(65) Prior Publication Data

US 2019/0390998 A1 Dec. 26, 2019

(51) Int. Cl.
*G01F 23/284* (2006.01)
*G01F 25/00* (2006.01)
*G01S 13/88* (2006.01)

(52) U.S. Cl.
CPC ........ *G01F 23/284* (2013.01); *G01F 25/0061* (2013.01); *G01S 13/88* (2013.01)

(58) Field of Classification Search
CPC .... G01F 23/283; G01F 23/284; G01F 23/285; G01F 25/61; G01R 29/08; G01S 13/88; H01P 7/06
USPC ................. 324/124, 636, 637, 644; 343/703; 343/700 MS; 333/228
See application file for complete search history.

(56) References Cited

U.S. PATENT DOCUMENTS

| 2,701,343 | A | * | 2/1955 | Lange | ...................... H01P 7/06 333/228 |
| 6,266,022 | B1 | * | 7/2001 | Muller | .................. G01F 23/284 324/644 |
| 6,629,458 | B1 | | 10/2003 | Westerling et al. | |
| 7,265,558 | B1 | * | 9/2007 | Penndal | ................ G01F 23/284 324/637 |
| 8,040,274 | B2 | | 10/2011 | Wendler et al. | |
| 2004/0080324 | A1 | * | 4/2004 | Westerling | ............ G01F 23/284 324/644 |

(Continued)

OTHER PUBLICATIONS

Notification of Transmittal of the International Search Report and the Written Opinion of the International Searching Authority of PCT/EP2019/066904, dated Sep. 13, 2019.

*Primary Examiner* — Timothy X Pham
(74) *Attorney, Agent, or Firm* — Westman, Champlin & Koehler, P.A.

(57) ABSTRACT

A radar level gauge having a wave guiding structure arranged to guide a measurement signal towards the surface and to return the reflected signal, and an electromagnetic wave transducer arranged to emit the measurement signal into the wave guiding structure as electromagnetic waves. The electromagnetic wave transducer has a plurality of radiating elements arranged in N−1 concentric feeder rings, where a radius of each feeder ring coincides with a radial zero of an electrical field of the $H_{0N}$-mode, and feeding circuitry connected to feed the measurement signals from the transceiver circuitry to the radiating elements, thereby causing the electromagnetic wave transducer to excite electromagnetic waves in the $H_{01}$-mode.
With this choice of feeder ring radii, the $H_{0N}$ mode will not be excited.

19 Claims, 6 Drawing Sheets

(56) References Cited

U.S. PATENT DOCUMENTS

2012/0007768 A1* 1/2012 Hemmendorff ....... G01F 23/284
                                                    342/124
2012/0169527 A1   7/2012 Edvardsson
2018/0010441 A1* 1/2018 Ramachandran ..... G01F 23/284

* cited by examiner

RADAR LEVEL GAUGE WITH $H_{01}$-MODE WAVE TRANSDUCER

FIELD OF THE INVENTION

The present invention relates to a radar level gauge with an electromagnetic wave transducer generating $H_{01}$-mode ($TE_{01}$) waves propagating in a circular wave guide.

BACKGROUND OF THE INVENTION

Radar level gauge systems for measuring the level of a liquid or other filling materials in a tank are well-known, and such a system generally comprises a transmitter for transmitting a microwave signal towards the surface of the liquid, a receiver for receiving the microwave signal reflected against the surface of the liquid, and a signal processing device for calculating the level of the liquid in the tank from the propagation time of the transmitted and reflected microwave signal. Such device has become more and more important, particularly for petroleum products such as crude oil and products manufactured from it. The tank may be a large container constituting parts of the total loading volume of a tank ship, or even larger usually circular-cylindrical land-based tanks with volumes of tens or thousands of cubic meters.

In some applications the tank may contain interior structures causing disturbing reflections. In other applications, the tank may have a floating roof, movably arranged and adapted to be located close to the surface. In both these situations, it may be advantageous to provide the gauge with a wave guiding structure, typically a so called "still pipe" with a circular cross-section, extending from the antenna into the contents of the tank. The wave guiding structure acts as a circular waveguide where the electromagnetic waves propagate.

There are multiple propagation modes for an electromagnetic wave depending on its cross-sectional field patterns. In Transverse Electric (TE) mode (also called H-mode), electric fields are in the cross-section which means only H component (magnetic) are in the longitudinal direction. In Transverse Magnetic (TM) mode (also called E-mode), magnetic fields are in the cross-section which means only E component (electric) are in the longitudinal direction. In a circular waveguide, such as a still pipe, the $TE_{01}$ or $H_{01}$ mode is the preferred mode because of its low loss and low dispersion properties. The first suffix indicate the number of variations the field has in the angular direction while the second suffice indicate the number of variations the field has in the radial direction.

There are several ways to generate a $H_{01}$-mode electromagnetic waves for radar level gauging. A patch or slot array is often used inter alia because it may be manufactured using well-known printed wiring board (PWB) techniques. A typical layout of a $H_{01}$-array is one or several concentric rings of radiator elements (patches or radial slots—twice as many slots as patches). The radiator elements are fed with electromagnetic signals in order to create a circumferential electrical field typical for the $H_{01}$ propagation mode. As an example of such an antenna, reference is made to U.S. Pat. No. 6,266,022, disclosing a planar antenna with two concentric rings of radiating elements.

Unfortunately, due to the discrete layout of patches/slots, such wave transducers also create at least some parasitic modes in addition to the desired $H_{01}$-mode and these parasitic modes will have a negative impact on gauge performance.

In order to suppress such parasitic modes, prior art document U.S. Pat. No. 8,040,274 discloses an array antenna protection element which is provided with concentric ridges which serve to suppress the unwanted modes.

General Disclosure of the Invention

It is an object to the present invention to provide an $H_{01}$-mode array transducer with a relatively stronger $H_{01}$-mode.

According to the present invention, this and other objects are achieved with a radar level gauge having transceiver circuitry arranged to generate an electromagnetic measurement signal and to receive a reflected signal, processing circuitry connected to the transceiver circuitry and arranged to determine the process variable based on a relationship between the measurement signal and the reflected signal, a wave guiding structure arranged to guide the measurement signal towards the surface and to return the reflected signal, an electromagnetic wave transducer arranged to emit the measurement signal into the wave guiding structure as electromagnetic waves, the electromagnetic wave transducer having a plurality of radiating elements arranged in N−1 concentric feeder rings, where N is three or greater, where a radius of each feeder ring coincides with a radial zero of an electrical field of the $H_{0,N}$-mode, and feeding circuitry connected to feed the measurement signals from the transceiver circuitry to the radiating elements, thereby causing the electromagnetic wave transducer to excite electromagnetic waves in the $H_{01}$-mode.

The invention is based on the understanding that the non-continuous nature of any $H_{01}$-mode array transducer will generate specific modes inherent to the layout of the array. Experience shows that $H_{02}$ and $H_{03}$ are the most disturbing modes and that can be expected by the non-continuous radial arrangement of the patches. A closer analysis reveals that the degree of disturbance depends on the strength of the disturbing modes (dB below $H_{01}$) but also on how far the eigenvalues (roots) of the disturbing modes are from that of $H_{01}$. This means that mode suppression is mainly required for the "closest", low Bessel root, parasitic modes, i.e. $H_{02}$, $H_{03}$, $H_{04}$, $H_{05}$, etc.

Modes with eigenvalues much greater than $H_{01}$ will disturb only at small distances. Thus they are easier to tolerate as long as the total power in such modes is small compared to the desired mode $H_{01}$. Depending on pipe diameter and frequency, a lower limit for mode eigenvalues can be established, above which limit the "disturbing modes" are less disturbing at least for distances within the practically used measuring range.

According to the present invention, the transducer has N−1 rings of radiating elements, the radius of the N−1 rings being chosen to fit the N−1 radial zeroes of the circumferential E-field of the mode $H_{0,N}$. This ensures that the $H_{0,N}$-mode is essentially not excited at all. It is noted that N is an integer number three or greater, and that N=3 corresponds to two feeder rings placed in the radial zeroes of the E-field of the $H_{03}$-mode.

So, in other words, instead of placing the rings of radiating elements where they maximize the desired mode, they are placed where they minimize an unwanted mode. As a result, the wave transducer will excite the desired $H_{01}$-mode without exciting the $H_{0,N}$-mode.

In one embodiment, the amplitude of the excitation of each ring is chosen to minimize the amplitude of $H_{02}$-$H_{0,N-1}$ modes (also referred to as "intermediate" modes, as they are located between the wanted mode ($H_{01}$ and the non-exited mode ($H_{0N}$)). For example, with four rings (N=5), the $H_{05}$-mode is not excited, and the amplitudes are chosen such that the $H_{02}$-mode, $H_{03}$-mode and $H_{04}$-mode are all (at least substantially) cancelled.

A surprising consequence of choosing the relative amplitudes such that "intermediate" modes are substantially cancelled, is that also a number of additional modes are significantly suppressed. For example, with four rings, seven modes (i.e. modes $H_{02}$-$H_{08}$) will be significantly suppressed. More specifically, it appears that 2N−3 modes above $H_{01}$ will be significantly suppressed (at least −12 dB).

The feeding arrangement preferably comprises a set of radial feeding arms, each feeding arm connected to a subset of radiating elements via a network of power dividers. The power dividers may then be configured to ensure appropriate amplitudes to each feeder ring and each radiating element. If all regularly spread arms (M pieces) are fed in the same amplitude and phase only modes with circumferential variation of order 0, M, 2M and so on are exited and if M is so big that $H_{M,1}$ is cut-off (i.e. cannot propagate) only circularly symmetric modes are generated.

In some embodiments, the radiating elements are patches or slots of an array antenna. By using the teachings of the present invention, the density of patches may be less than 1 patch/$\lambda^2$ (or for slots, less than two slots/$\lambda^2$). This means that the density of patches/slots is significantly more sparse (approximately half the number of elements) compared to a conventional patch antenna, thereby reducing cost and complexity.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

System Overview

Figure 1:
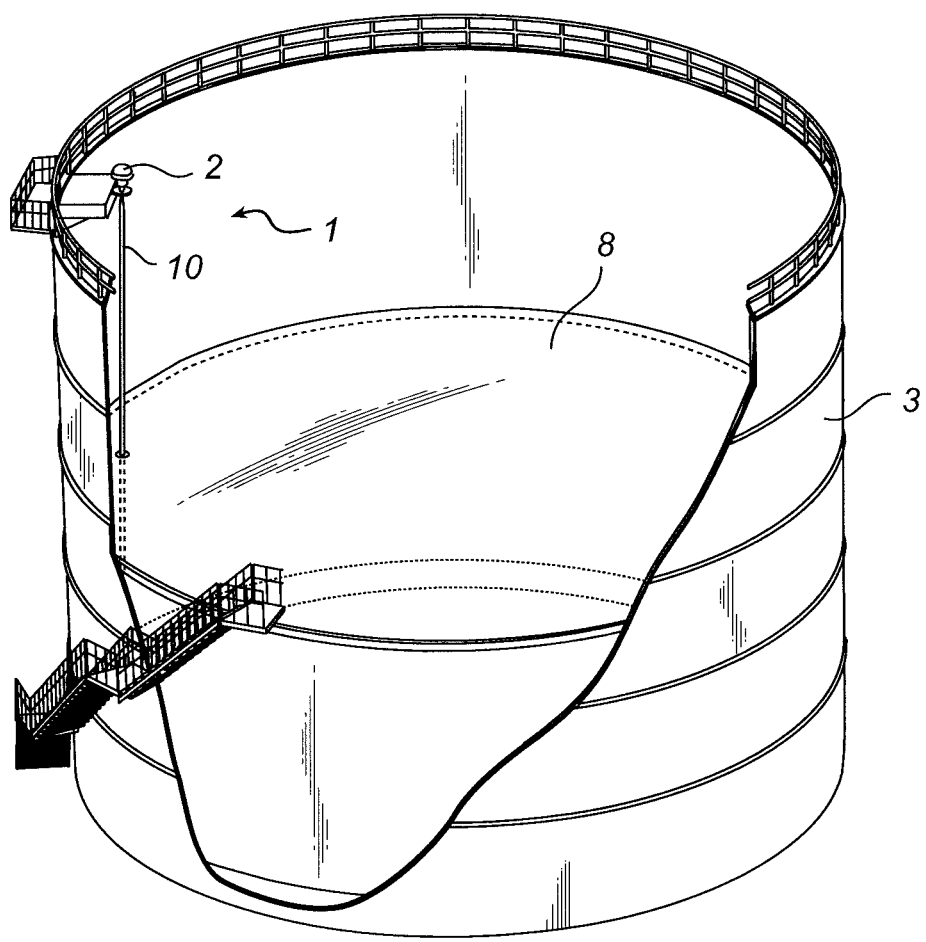
FIG. 1 shows a floating roof tank having a radar level gauge mounted thereon.
Figure 2:
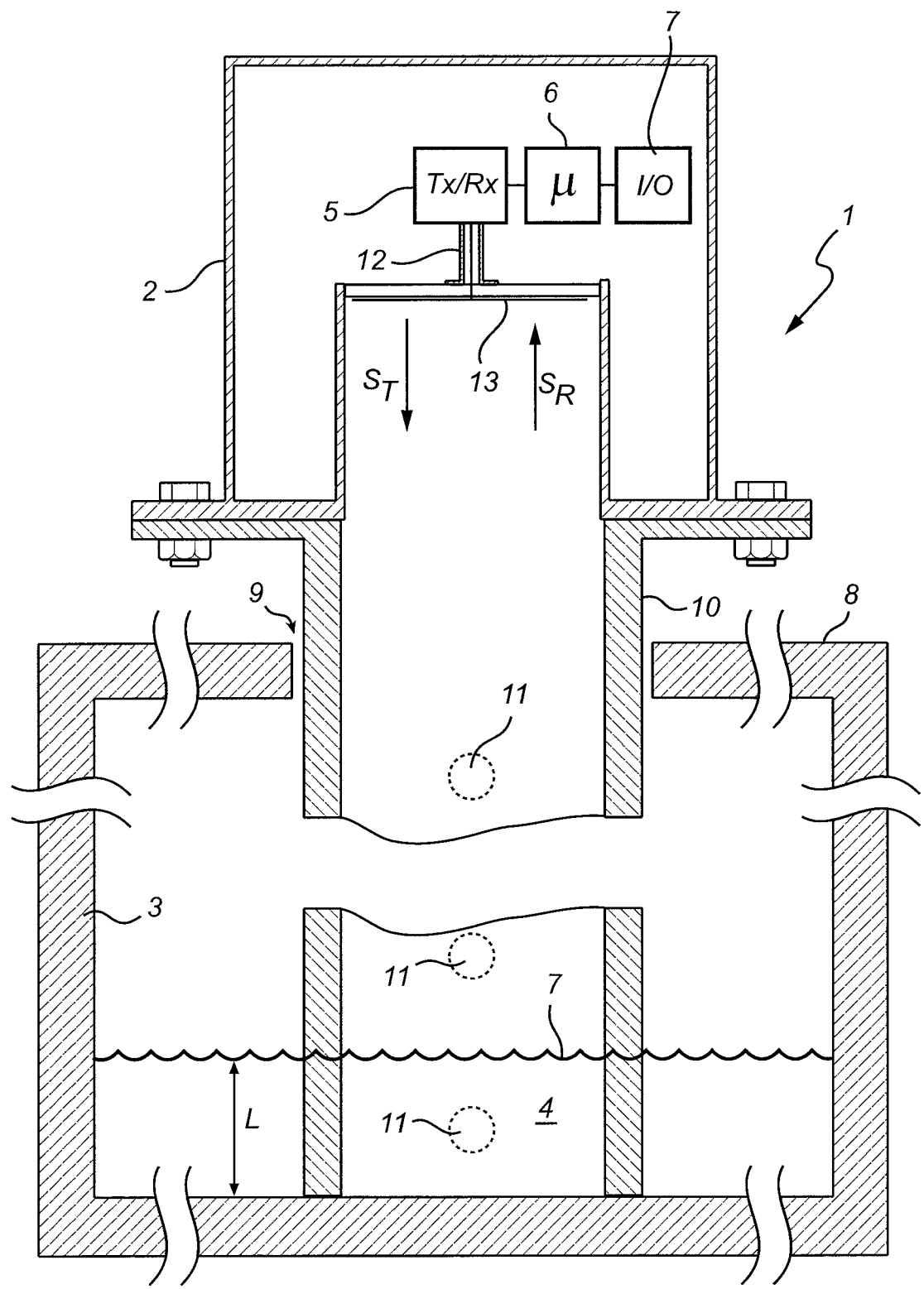
FIG. 2 shows the radar level gauge in more detail.

FIGS. 1 and 2 shows schematically a radar level gauge (RLG) system 1 according to an embodiment of the present invention. The RLG 1 comprises an electronics unit 2 mounted on a tank 3. The tank contains a product 4, which may be a liquid petroleum product, such as crude oil or a product manufactured from it, or a condensed gas, which is stored in the container at overpressure and/or cooled. Propane and butane are two typical gases stored as liquids.

The unit 2 houses a transceiver 5, for transmitting a microwave signal and receiving a reflected microwave signal, and processing circuitry 6 for determining the distance to a reflecting surface 7 (or any other impedance transition) based on the transmitted measurement signal and the reflected signal. The transceiver 5 may be one functional unit capable of transmitting and receiving electromagnetic signals, or may be a system comprising separate transmitter and receiver units. The elements of the transceiver 5 are typically implemented in hardware, and form part of an integrated unit normally referred to as a microwave unit. The processing circuitry 7 may include a combination of analogue processing realized in hardware, and digital processing realized embodied by software modules stored in a memory and executed by an embedded processor. The invention is not restricted to the particular realization, and any implementation found suitable to realize the herein described functionality may be contemplated.

The system may be a frequency modulated continuous wave (FMCW) RLG system or a pulsed RLG system or any other type of distance measuring radar, but is preferably the former. The RLG system may have a capability of transmitting a microwave signal at a variable frequency, which is adjustable.

In the illustrated example, the tank 3 has a floating roof 8, i.e. a cover which is arranged to be supported by the upper surface of the product 4. In large liquid tanks, in particular fuel and oil tanks at refineries and the like, which are capable of holding large amounts of oil products, use is frequently made of such floating roofs which float on the liquid held in the tank and is displaceable in a vertical direction. Thus, the floating roof is capable of following the level of a liquid (oil product) when the liquid is discharged from or filled into the tank. Floating roofs of this type are used for preventing leakage of vapors and gases from the tank into the atmosphere and ingress of e.g. rainwater from the surroundings into the liquid. Typically, the prevention of leakage and ingress is enhanced by a sealing arrangement fitted along a perimeter of the floating roof for providing sealing and sliding contact with an inner wall of the tank. Further, using a roof that floats on the liquid enables minimizing a space between the liquid and the roof and thereby minimizing the amount of gases and liquid in vapor form in this space. In case of fuel and oil tanks, the environment on top of the floating roof is a hazardous or potentially hazardous environment.

The RLG further system comprises a waveguiding structure 10, in the form of a substantially vertical tube or cylinder that is rigidly mounted in the tank 3. The waveguide is here referred to as a still pipe. The still pipe 10 passes through an opening 9 in the floating roof.

The still pipe 10 is preferably of a metallic material to be capable of acting as a waveguide for microwaves and may have an arbitrary cross-sectional shape. A circular cross-section is preferred and in most cases the still pipe is not part of the installation but a part of the existing tank structure. The tube is not shown in its entire length but only in its upper and lower portions. The tube is provided with a number of relatively small openings 11 in its wall, which makes possible the communication of the fluid from the container to the interior of the tube, so that the level of the liquid is the same in the tube as in the container. Experience has shown that by using the $H_{01}$-mode in a still pipe which has a diameter significantly larger than the wavelength, such holes will have a negligible influence on the wave propagation.

The transceiver 5 comprises a transmitter waveguide 12 connected to an electromagnetic wave transducer 13. The transducer 13 is preferably mounted inside the still pipe 10 to avoid grating lobes and to get correct input match. As illustrated in more detail in FIGS. 4a-4c, the electromagnetic wave transducer 13 is here an array transducer, including a plurality of radiating elements (here patches 14, but alternatively slots), arranged in one or several concentric feeder rings 15 (circles), and configured to emit electromagnetic waves to propagate through the still pipe 10. As mentioned, it is desirable that as much of the microwave energy as possible is emitted in the $H_{01}$-mode.

The transducer 13 is shown flat in FIG. 2. However, in practice it may be advantageous to provide the transducer with a conical shape, to promote drip-off of condensate or liquid product sticking to the transducer surface. Such a design is disclosed e.g. in U.S. Pat. No. 6,629,458.

In use, the transceiver 5 generates and transmits an electromagnetic (microwave) transmit signal $S_T$ (measurement signal) and receives an electromagnetic (microwave) return signal $S_R$ (reflected signal). The transmit signals $S_T$ are emitted towards the surface 7 of the product 4 by the wave transducer 13 in the still pipe 10. The electromagnetic return signals $S_R$ are caused by a reflection in the surface 7, and are returned by the still pipe 10 and transducer 13, and then fed back to the transceiver 5.

The processing circuitry 6 determines the distance between a reference position at the top of the tank (such as the passage between the outside and the inside of the tank) and the surface 7 by analyzing the transmit signal $S_T$ and the return signal $S_R$. The processing typically includes generation of a tank signal or "echo curve", including a peak representing an echo from the surface 7. Thanks to the still pipe 10, interfering echoes from the tank are typically avoided. Based on the determined distance to the surface 7, generally referred to as ullage, and known dimensions of the tank 4, a process variable such as the filling level L of the tank can be deduced.

The transmit signal is here a high frequency signal, with an operating frequency range greater than 1 GHz. Typically, the operating frequency range is centered around 6 GHz, 10 GHz, or 26 GHz, with a band-width of one or several GHz. Even higher frequencies, such as 80 GHz may also be contemplated.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal. According to another measurement principle, the transmit signal is a train of distinct modulated pulses with a duration in the order of ns and a repletion frequency in the order of MHz. The return signal is sampled with the original pulse train in a sample and hold circuit in a process known as time domain reflectometry (TDR), thereby forming a time domain tank signal. The transmit signal may also be some combination of FMCW and a pulsed signal. For example, a principle known as multiple frequency pulsed wave (MFPW) has been proposed.

Wave Transducer Design

With reference primarily to FIGS. 3a-3b and FIGS. 4a-4e, the design of the electromagnetic wave transducer will now be discussed. As mentioned, the wave transducer 13 here includes patches, which are excited by the transmit signal as will be discussed below. The layout of the patches will determine the mode(s) of the emitted waves. An alternative principle, not further discussed herein, is to form the wave transducer as a conducting layer with a set of slots, and place it in front of a wave guide in which the transmit signal is propagating. The slots will convert the waves propagating in the wave guide to a different mode, depending on the layout of the slots. This is the solution shown e.g. in U.S. Pat. No. 6,266,022.

In both cases, and especially in the latter case, the wave transducer can be seen as a "mode converter", converting a first propagation mode to a second. Here, the expression "transducer" has been chosen.

Figure 3A:
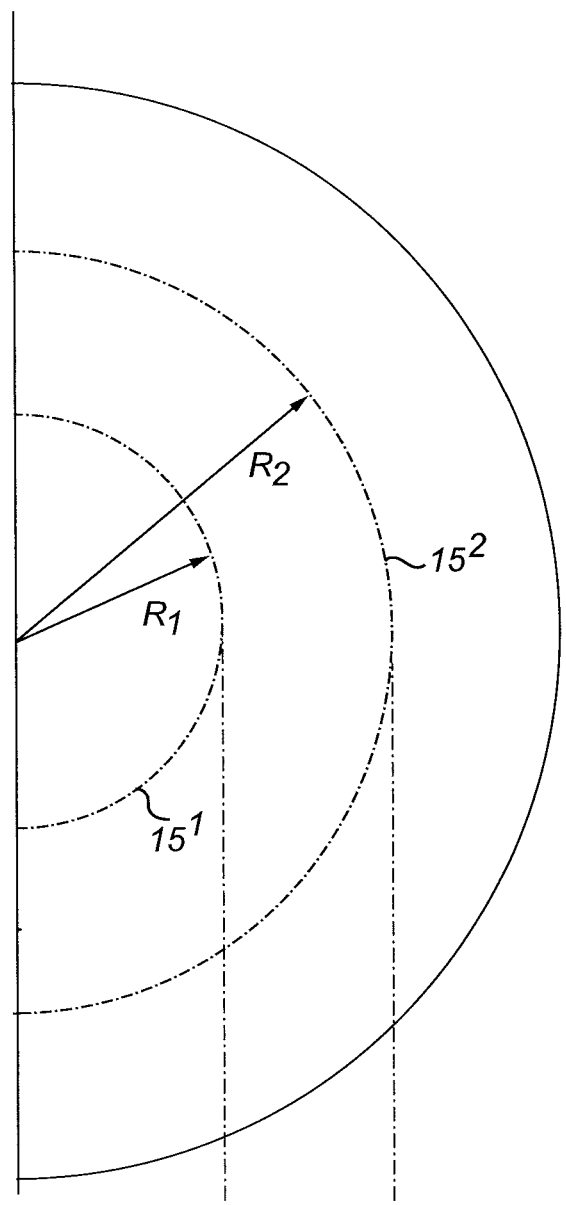
FIGS. 3a and 3b show radial variation of modes and placement of feeding rings.
Figure 3A:
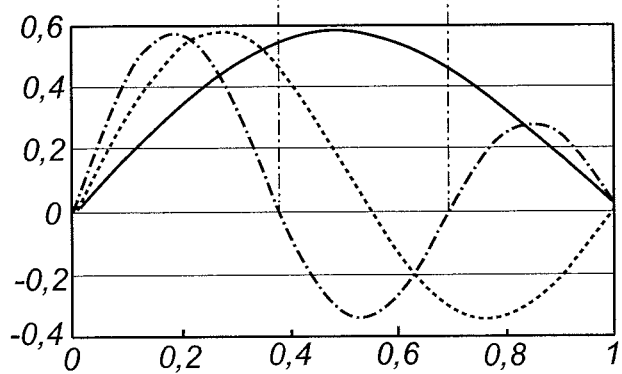

Electromagnetic waves in H-mode (also referred to as Transverse Electric (TE) mode), the electric field varies in the cross-section of the wave guide, while the magnetic field varies in the longitudinal direction of the wave guide. FIG. 3a shows how the amplitude of the circumferential E-field of the first four H-modes, i.e. $H_{01}$-$H_{04}$, varies with the radius of a circular wave guide (such as the still pipe 10), and FIG. 3b shows the first six H-modes, i.e. $H_{01}$-$H_{06}$.

Figure 3B:
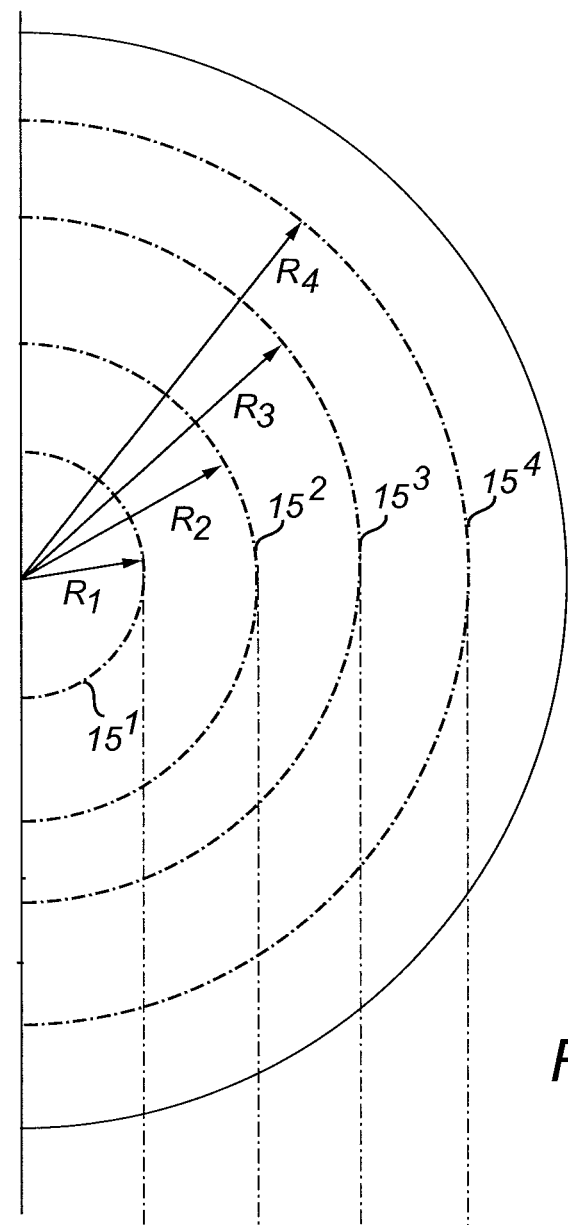
Figure 3B:
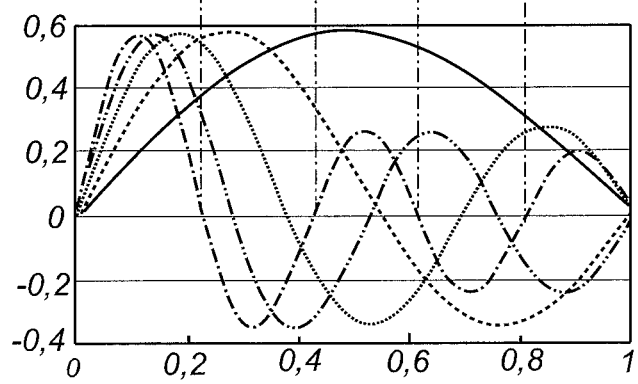

From FIGS. 3a and 3b it is clear that there will be places along the radius where modes above $H_{01}$ will have zero amplitude. In fact, each mode $H_{0N}$ will have N–1 zeroes. The two radii (R1 and R2) where the mode $H_{03}$ has zero amplitude have been indicated in FIG. 3a, and the four radii (R1, R2, R3, R4) where the mode $H_{05}$ has zero amplitude have been indicated in FIG. 3b.

According to an embodiment of the present invention, the number and placement of feeder rings, are chosen such that the feeder rings coincide with the radial zeroes of one of the $H_{0N}$-modes. By this placement of radiating elements, the excitation of mode $H_{0N}$ can be substantially avoided.

In other words, first an appropriate $H_{0N}$-mode is chosen (based on operating frequency and pipe diameter, as will be discussed in more detail below), and then, N–1 radial distances $R_1, R_2 \ldots R_{N-1}$ are identified in which the circumferential E-field of the chosen $H_{0N}$-mode has zero amplitude. Patches 14 (or slots) are arranged, e.g. using PWB techniques, in concentric feeder rings 15 located at the identified radial distances. In use, all feeder rings 15 are fed in the same phase, which results in the $H_{0N}$-mode practically not being excited at all.

To illustrate the principle, FIGS. 3a and 3b schematically indicate placement of feeder rings 15 coinciding with the indicated radial distances; two rings in FIG. 3a and four rings in FIG. 3b. By feeding a signal to the two feeder rings 15 in FIG. 3a, the $H_{03}$-mode will not be excited, and by feeding a signal to the four feeder rings in FIG. 3b, the $H_{05}$ mode will not be excited.

Table 1 shows such radial distances (expressed as fraction of pipe radius) for N between 2 and 9 (1-8 rings). It is clear that N=3 corresponds to FIG. 3b, while N=5 corresponds to FIG. 3c.

TABLE 1

| Appropriate radius for different feeder rings | | | | | | | | | |
|---|---|---|---|---|---|---|---|---|---|
| N | Rings | R1 | R2 | R3 | R4 | R5 | R6 | R7 | R8 |
| 2 | 1 | 0.546 | | | | | | | |
| 3 | 2 | 0.377 | 0.69 | | | | | | |
| 4 | 3 | 0.288 | 0.526 | 0.763 | | | | | |
| 5 | 4 | 0.233 | 0.426 | 0.618 | 0.809 | | | | |
| 6 | 5 | 0.195 | 0.358 | 0.519 | 0.679 | 0.84 | | | |
| 7 | 6 | 0.168 | 0.308 | 0.447 | 0.585 | 0.724 | 0.862 | | |
| 8 | 7 | 0.148 | 0.271 | 0.393 | 0.514 | 0.636 | 0.757 | 0.879 | |
| 9 | 8 | 0.132 | 0.242 | 0.35 | 0.459 | 0.567 | 0.675 | 0.784 | 0.892 |

Returning to FIG. 3a/4a, it is clear that the all modes (except $H_{01}$) have a radially oscillating E-field across the radius of the waveguide. More specifically, the $H_{02}$-mode will be alternatingly positive and negative in the radial zeroes of the $H_{03}$-mode, and the $H_{02}$-, $H_{03}$- and $H_{04}$-modes will all be alternatingly positive and negative in the radial zeroes of the $H_{05}$-mode.

Generally speaking, the N–2 modes between $H_{01}$ and $H_{0N}$ (herein referred to as the "intermediate" modes) will be alternatingly positive and negative in the radial zeroes of the E-field of the $H_{0N}$-mode. This means that an appropriate linear combination of amplitudes in the different feeding rings will allow substantial cancellation of these intermediate modes.

To determine the relative amplitude of each feeder ring, a system of linear equations can be established based on the amplitudes of the intermediate modes in the N−1 radial distances. More specifically, $$\text{Amplitude}(H_{0m}) = \sum_{n=0}^{N-1} a_n A_{mn} \quad (1)$$

wherein an (n=0, 1, . . . , N−1) represents the relative amplitude of the feeder ring n, and the coefficients $A_{m,n}$ equals to $J1(r_m*X_{0,n})/J0(X_{0,n})$ to make a Fourier expansion of the mode pattern with J0(x) and J1(x) being the relevant Bessel functions and $r_m$ the radius of feeder ring m.

In case of 4 rings at the radius $r_1$, $r_2$, $r_3$ and $r_4$ having amplitudes $a_1$, $a_2$, $a_3$ and $a_4$ the amplitudes of the first four modes can be expressed:

$$\text{Amplitude}(H_{01}) = a_1*A_{1,1} + a_2*A_{2,1} + a_3*A_{3,1} + a_4*A_{4,1}$$

$$\text{Amplitude}(H_{02}) = a_1*A_{1,2} + a_2*A_{2,2} + a_3*A_{3,2} + a_4*A_{4,2}$$

$$\text{Amplitude}(H_{03}) = a_1*A_{1,3} + a_2*A_{2,3} + a_3*A_{3,3} + a_4*A_{4,3}$$

$$\text{Amplitude}(H_{04}) = a_1*A_{1,4} + a_2*A_{2,4} + a_3*A_{3,4} + a_4*A_{4,4}$$

The amplitude of $H_{01}$ represents the desired amplitude output of mode $H_{01}$ and should be positive, while all the other modes should be zero. Under these conditions, the equation system above can be used to solve the amplitudes $a_1$, $a_2$, $a_3$ and $a_4$. Other amplitude combinations will also be possible as of course any number of rings.

By making this choice of the radius $r_1$, $r_2$, $r_3$ and $r_4$ it is ensured that $H_{05}$ will be zero. As will be discussed below, a surprising effect is that also $H_{06}$, $H_{07}$ and $H_{08}$ (or more general all modes from $H_{0,2}$ to $H_{0,\text{twice the number of rings}}$) will be substantially zero.

By solving this system of equations, appropriate relative amplitudes of each feeding ring can be determined which substantially cancel all "intermediate" modes. Table 2 shows the resulting amplitudes (A1-A8) for N between 3 and 9 (2-8 rings). It is noted that it is only the relative amplitude that is relevant, not the absolute value. So, in table 2, the amplitude of the first ring is set to one.

TABLE 2

Appropriate relative amplitudes for different feeder rings

| N | Rings | a1 | a2 | a3 | a4 | a5 | a6 | a7 | a8 |
|---|-------|----|----|----|----|----|----|----|----|
| 3 | 2 | 1 | 1.503 | | | | | | |
| 4 | 3 | 1 | 2.196 | 2.020 | | | | | |
| 5 | 4 | 1 | 2.557 | 3.398 | 2.540 | | | | |
| 6 | 5 | 1 | 2.768 | 4.297 | 4.580 | 3.058 | | | |
| 7 | 6 | 1 | 2.900 | 4.911 | 6.100 | 5.733 | 3.589 | | |
| 8 | 7 | 1 | 2.968 | 5.323 | 7.194 | 7.871 | 6.855 | 4.097 | |
| 9 | 8 | 1 | 3.068 | 5.659 | 8.091 | 9.636 | 9.727 | 8.045 | 4.659 |

By such a selection of relative amplitudes, the "intermediate" nodes can, at least in theory, be completely eliminated. In addition to this, experiments reveal the surprising effect that, at least for a configuration with up to eight rings, a number of additional modes will also be significantly suppressed. More specifically, the 2N−3 modes above $H_{01}$ will be significantly suppressed (at least −12 dB). For 25 GHz this will be sufficient to get <±0.5 mm mode disturbances for a 12" transducer.

Table 3 shows the suppression of $H_{0n}$-modes (except for $H_{01}$) up to a certain limit of Bessel roots for transducers with up to eight rings (N=9). Calculations show that all "suppressed" modes are suppressed (in the mathematical sense) to amplitudes in the order of 0.001 or lower, while the first "un-suppressed" mode is maximized by 0.5. Thus there is a quite sharp limit between the "suppressed modes" and the "first unsuppressed mode".

As discussed above, it is advantageous to avoid disturbing modes having eigenvalues (Bessel roots) below a certain value based on pipe diameter and frequency. The table above can be used to determine the required number of rings to avoid modes with too low eigenvalues with regard to pipe and frequency. As a first estimation pipe diameter divided by four wavelengths has been found to be a crude estimation of the number of rings.

TABLE 3

Suppressed and unsuppressed $H_{0n}$-modes

| N | Rings | Number of eliminated or substantially suppressed modes | Mode | Bessel root | Approximate amplitude |
|---|-------|---|---|---|---|
| 2 | 1 | 1 | $H_{03}$ | 10.173 | −5 dB |
| 3 | 2 | 3 | $H_{05}$ | 16.471 | −7 dB |
| 4 | 3 | 5 | $H_{07}$ | 22.760 | −9 dB |
| 5 | 4 | 7 | $H_{09}$ | 29.047 | −10 dB |
| 6 | 5 | 9 | $H_{0,11}$ | 35.332 | −11 dB |
| 7 | 6 | 11 | $H_{0,13}$ | 41.617 | −12 dB |
| 8 | 7 | 13 | $H_{0,15}$ | 47.901 | −13 dB |
| 9 | 8 | 15 | $H_{0,17}$ | 54.186 | −14 dB |

To give an impression of how large eigenvalues we have to look for some examples are given in table 4 below. For five pipe diameters and two frequencies (10 and 26 GHz) some simple disturbing cases have been calculated. In addition to the $H_{01}$-signal (eigenvalue 3.832) one signal which is 6 dB lower at a mode having an eigenvalue Y is generated by the mode transduces and consequently received after reflection by the surface. Its influence to introduce a measuring error at measuring distances over 2 m is estimated and expressed as the minimum limit for Y to keep said error below ±2 mm and ±0.5 mm. The minimum distance is chosen in the example from typical design of big floating roof tanks for crude but of course the quoted figures are as illustrative examples only.

TABLE 4

Lower limit for Bessel roots for pipes and frequencies to keep error < 0.5-2 mm

| | 10 GHz (BW = 1.4 GHz) | | 26 GHz (BW = 2.5 GHz) | |
|---|---|---|---|---|
| Nom. pipe diam. | Error < 2 mm | Error < 0.5 mm | Error < 2 mm | Error < 0.5 mm |
| 4" | Y ≥ 8 | Y ≥ 10 | Y ≥ 14 | Y ≥ 20 |
| 6" | Y ≥ 12 | Y ≥ 14 | Y ≥ 20 | Y ≥ 30 |
| 8" | Y ≥ 15 | Y ≥ 19 | Y ≥ 27 | Y ≥ 42 |
| 10" | Y ≥ 18 | Y ≥ 24 | Y ≥ 30 | Y ≥ 51 |
| 12" | Y ≥ 22 | Y ≥ 28 | Y ≥ 36 | Y ≥ 60 |

By studying a number of cases the lower limit for Y in table 4 can be roughly estimated to be 3.4 times the pipe diameter in wavelength is the radar bandwidth would be 1 GHz. A wider bandwidth would decrease the limit for Y by (bandwidth in GHz−2)/3 and one obvious advantage with a higher frequency is the practical possibility to increase the bandwidth. It is expected that higher frequencies (like 80 GHz) can be treated similarly. It should be noted that the eigenvalue is the most important property for the disturbing modes and other properties like polarization will have less but sometimes not negligible influence.

By combining table 3 with table 4, the number of required rings (and thus the number N) can be determined.

As one example, according to table 4, for an 8" pipe and at 10 GHz, the Bessel root of a first non-suppressed mode having attenuation −6 dB should be above 15 to obtain an accuracy of less than ±2 mm and above 19 to obtain an accuracy of less than ±0.5 mm. According to table 3, an accuracy of less than ±0.5 mm will thus require three rings (N=4), in which case the first non-suppressed mode is $H_{07}$ at −9 dB, having a Bessel root of 22,760 (i.e. greater than 19). If accuracy of ±2 mm were acceptable, then two rings (N=3) could be sufficient. In a practical use case, the combined influence of all disturbing modes may require some adjustment of these conclusions.

Another example, for a 12" pipe and at 25 GHz, table 4 indicates that the Bessel root of a first non-suppressed mode having attenuation −6 dB should be above 36 to obtain an accuracy of less than ±2 mm and above 60 to obtain an accuracy of less than ±0.5 mm. The error is essentially proportional to the amplitude of the disturbing mode and as indicated in table 3 the amplitude of the first unsuppressed mode is smaller when the number of rings is bigger. Thus instead of the 7-8 rings suggested by tables 3 and 4 practical designs have proved 6 rings to be sufficient in similar cases. It is noted that an even number of rings is probably more convenient than an odd number of rings, considering arrangement of power dividers.

At a hypothetical 80 GHz case the Bessel roots would increase to 63-96 and perhaps 14 rings.

The number of radiating elements in each feeder ring will also have an impact on the parasitic modes. If the outermost feeder ring in a transducer has M elements (M slots or M/2 patches) fed with the same amplitude and phase, the transducer will excite not only the $H_{0,1}$-mode also $H_{M,1}$ and $E_{M,1}$ and possibly $H_{2M,1}$ and $E_{2M,1}$. The $H_{M,1}$-mode will have an eigenvalue slightly (<10%) higher than M and $E_{M,1}$ will have its eigenvalue still a bit higher. For instance the eigenvalues of $H_{M,1}$ for M=16, 32, 64 and 128 are 18.1, 34.6, 67.7 and 132.3.

As shown in table 4 above, modes with high eigenvalues may will not disturb unless for very small measuring distances outside the normal measuring range. Following the estimations in table 4 some examples of minimum M for pipe diameters and frequencies are shown below in table 5. With reference to table 4 it is assumed that the disturbing mode is 6 dB lower than $H_{0,1}$ but as discussed earlier this may be a conservative estimation.

TABLE 5

Required number of patches in the outhermost feeder ring

| Pipe diameter | 10 GHz | 26 GHz |
|---|---|---|
| 4" | M ≥ 16 | M ≥ 32 |
| 6" | M ≥ 16 | M ≥ 32 |
| 8" | M ≥ 32 | M ≥ 64 |
| 10" | M ≥ 32 | M ≥ 64 |
| 12" | M ≥ 32 | M ≥ 64 |

For large number M of radiating elements in a feeder ring, modes of type $H_{M,1}$ will have a very low circumferential field except close to the pipe wall. The number M above thus only applies to the 1-2 outermost rings so a significant simplification of the etched pattern can be done by arranging fewer patches around the circumference for feeder rings with small radius (closer to the center). This is also advantageous as it allows sufficient space for connections and power dividers (see FIGS. 4a-4c).

PRACTICAL EXAMPLES

Figure 4A:
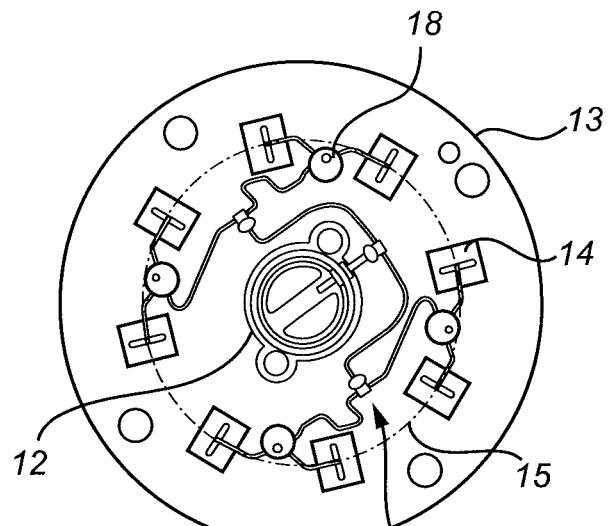
FIG. 4a-4c show specific examples of electromagnetic wave transducers.
Figure 4B:
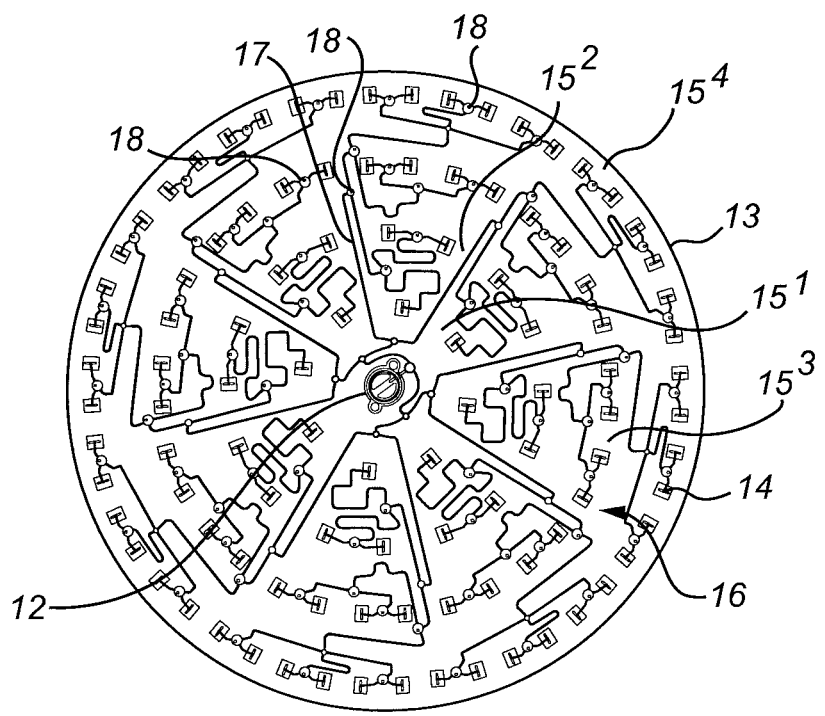
Figure 4C:
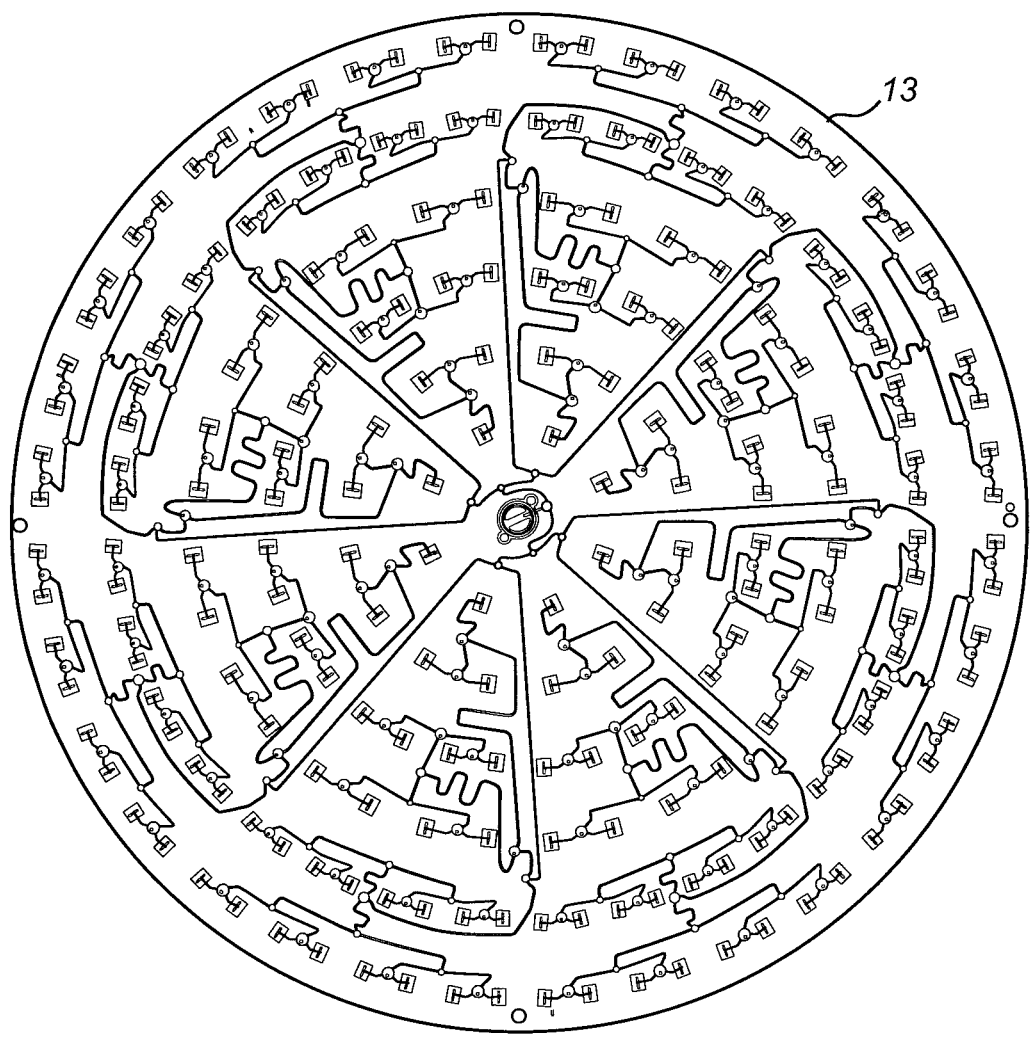

FIGS. 4a-4c show a set of examples of electromagnetic wave transducers 13 according to embodiments of the invention, using patches 14 as radiating elements. More specifically, the patches in FIGS. 4a-4c are aperture-coupled patches, including an aperture (slot) formed in a ground plane, sandwiched (and isolated from) a feeding line on one side and a radiating patch on the other.

The transducer in FIG. 4a has one ring (N=2), the transducer in FIG. 4b has four rings (N=5) while the transducer in FIG. 4c has six rings (N=7). The transducer in FIG. 4c has 8, 16, 32 and 48 patches in its four rings while the transducer in FIG. 4e has 8, 16, 32, 32, 64 and 64 in nits six rings. They are tested for 26 GHz in 8" and 12" pipes respectively.

The patches 14 in each feeder ring 15 are fed by a feeding arrangement 16 here including a central wave guide feeder, e.g. the wave guide 12 in FIG. 2, and a plurality of radially extending feeder arms 17. Each feeder arm is connected to a subset of the patches 14 via a network of power dividers 18 connected by signal lines. For reasons of symmetry, the feeder arms are preferably identical, and each feed the same number of patches 14 in each feeder ring. As an alternative to radially extending signal feeds, it could be possible to have separate signal feeds to each ring of patches.

Further, the power dividers 18 are arranged such that an appropriate portion of the power is fed to each patch 14. More specifically, the relative amplitude fed to a particular feeder ring 15 are chosen such that "intermediate" modes are substantially cancelled, i.e. chosen according to table 2 above.

In some embodiments, the feeding arrangement 16 includes a combination of Wilkinson power dividers and Gysel power dividers to obtain the correct amplitudes and phases for each patch 14. Generally speaking, a Wilkinson power divider is suitable to divide a signal in two (or more) equal parts, i.e. typically within the same feeder ring, while a Gysel power divider is suitable when a more arbitrary power division is required, i.e. typically between the different feeder rings. In one example, the feeding arrangement 16 includes an inner network of Wilkinson power dividers to divide the power in the desired number of feeding arms 17, and then a set of Gysel power dividers to obtain a correct amplitude for each feeder ring 15. However, there are many other possibilities.

Further, in the illustrated examples, neighboring patches 14 in the same feeder ring 15 are fed from opposite directions. To compensate for this, and to ensure that the patches are fed in the same phase, these particular power dividers are so called "180°-hybrid" dividers.

Still further, in the illustrated examples, the feeding arrangement 16 is designed such that the signal line length from each feeding arm 17 to each patch 14 is substantially identical. This ensures that all patches are fed in the same phase, and with the correct amplitude, even in a situation where the temperature varies (influencing wavelength and attenuation).

To illustrate the difference between an embodiment of the present invention (where feeder ring amplitudes are chosen to minimize undesired modes), and the conventional approach (where feeder ring amplitudes are chosen to optimize the desired radiation or mode (i.e. $H_{01}$)), table 6 provides one example for a 4 ring transducer in a 12 inch (153 mm) pipe.

As this simulation shows, there is a much weaker feeding of the outermost rings than a matching to the $H_{01}$-mode would result in. The radius of the feeder rings is generally larger than conventionally, and especially the smallest ring is 17% larger. As the smallest ring is larger, the distances between the rings is smaller than the conventional design.

TABLE 6

Comparison between invention and conventional approach for 10 GHz, 12 inch pipe, four rings

| Ring/number of patches | Design for optimized $H_{01}$ | | This design for suppressed $H_{02}$-$H_{08}$ | |
|---|---|---|---|---|
| | Radius mm | Rel. amplitude per ring | Radius mm | Rel. amplitude per patch |
| 1/8 | 30.7 | 1 | 35.8 | 1 |
| 2/16 | 61.4 | 3.161 | 65.4 | 2.557 |
| 3/16 | 92.1 | 4.555 | 94.9 | 3.398 |
| 4/16 | 122.8 | 3.534 | 124.2 | 2.540 |

The person skilled in the art realizes that the present invention by no means is limited to the preferred embodiments described above. On the contrary, many modifications and variations are possible within the scope of the appended claims. For example, the number of rings, number of patches/slots in each ring, and the details of the feeder arrangement may be different than in the above examples.

What is claimed is:

1. A radar level gauge for measuring a distance to a surface of a product in a tank, said radar level gauge comprising:
transceiver circuitry arranged to generate an electromagnetic measurement signal, and to receive a reflected signal;
processing circuitry connected to said transceiver circuitry and arranged to determine said distance based on a relationship between said measurement signal and said reflected signal;
a circular wave guide arranged to guide said measurement signal towards said surface, and to return said reflected signal;
an electromagnetic wave transducer arranged to emit said measurement signal into said circular wave guide as electromagnetic waves, said electromagnetic wave transducer having a plurality of radiating elements arranged in N−1 concentric feeder rings, where N is four or greater, where a radius of each feeder ring coincides with a radial zero of an electrical field of a $H_{0N}$-mode; and
feeding circuitry connected to feed the measurement signals from the transceiver circuitry to the radiating elements, thereby causing the electromagnetic wave transducer to excite electromagnetic waves in mode $H_{01}$.

2. The radar level gauge according to claim 1, wherein the feeding circuitry is configured to feed each feeder ring with a relative amplitude chosen such that an amplitude of mode(s) $H_{02}$-$H_{0,N-1}$ is/are substantially cancelled.

3. The radar level gauge according to claim 2, wherein said relative amplitude is chosen by forming a linear system of equations, including equations representing the amplitudes of said $H_{02}$-$H_{0,N-1}$ mode(s).

4. The radar level gauge according to claim 1, wherein the feeding circuitry is configured to feed all feeder rings in phase.

5. The radar level gauge according to claim 1, wherein the feeding circuitry is configured to feed all radiating elements in a feeder ring with one common amplitude.

6. The radar level gauge according to claim 1, wherein the feeding arrangement comprises a set of radial feeding arms, each feeding arm connected to a subset of radiating elements via a network of power dividers.

7. The radar level gauge according to claim 6, wherein the power dividers are configured to feed each feeder ring with a relative amplitude chosen such that an amplitude of mode(s) $H_{02}$-$H_{0,N-1}$ is/are substantially cancelled.

8. The radar level gauge according to claim 1, wherein each radiating element is a patch of a patch array antenna.

9. The radar level gauge according to claim 8, wherein each patch is an aperture coupled patch.

10. The radar level gauge according to claim 8, wherein the density of patches is less than 1 patch/$\lambda^2$, where $\lambda$ is the wavelength of the measurement signal.

11. The radar level gauge according to claim 1, wherein the circular wave guide is a cylindrical metal pipe, also referred to as a (still pipe).

12. The radar level gauge according to claim 1, having three feeder rings, wherein radii of the three rings, expressed as fraction of a radius of the circular wave guide, are 0.288, 0.526, and 0.763.

13. The radar level gauge according to claim 1, having four feeder rings, wherein radii of the four rings, expressed as fraction of a radius of the circular wave guide, are 0.233, 0.426, 0.618 and 0.809.

14. The radar level gauge according to claim 13, wherein each radiating element is a patch of a patch array antenna, and wherein the four rings have 8, 16, 32 and 48 patches, respectively.

15. The radar level gauge according to claim 1, having five feeder rings, wherein radii of the five rings, expressed as fraction of a radius of the cylindrical metal pipe, are 0.195, 0.358, 0.519, 0.679 and 0.84.

16. The radar level gauge according to claim 1, having six feeder rings, wherein radii of the six rings, expressed as fraction of a radius of the circular wave guide, are 0.168, 0.308, 0.447, 0.585, 0.724 and 0.862.

17. The radar level gauge according to claim 16, wherein each radiating element is a patch of a patch array antenna, and wherein the six rings have 8, 16, 32, 32, 64 and 64 patches, respectively.

18. The radar level gauge according to claim 1, having seven feeder rings, wherein radii of the seven rings, expressed as fraction of a radius of the circular wave guide, are 0.148, 0.271, 0.393, 0.514, 0.636, 0.757 and 0.879.

19. The radar level gauge according to claim 1, having eight feeder rings, wherein radii of the eight rings, expressed as fraction of a radius of the circular wave guide, are 0.132, 0.242, 0.35, 0.459, 0.567, 0.675, 0.784 and 0.892.

* * * * *